US012227456B2

(12) United States Patent
Bordin et al.

(10) Patent No.: US 12,227,456 B2
(45) Date of Patent: Feb. 18, 2025

(54) FIBER CEMENT PRODUCTS AND METHODS FOR THE PRODUCTION THEREOF

(71) Applicants: ETEX SERVICES NV, Kapelle-op-den-Bos (BE); ETEX BUILDING PERFORMANCE INTERNATIONAL SAS, Avignon (FR)

(72) Inventors: Ruben Bordin, Mechelen (BE); Julien Soulhat, Avignon (FR)

(73) Assignees: ETEX SERVICES NV, Kapelle-op-den-Bos (BE); ETEX BUILDING PERFORMANCE INTERNATIONAL SAS, Avignon (FR)

( * ) Notice: Subject to any disclaimer, the term of this patent is extended or adjusted under 35 U.S.C. 154(b) by 350 days.

(21) Appl. No.: 17/641,157

(22) PCT Filed: Sep. 4, 2020

(86) PCT No.: PCT/EP2020/074802
§ 371 (c)(1),
(2) Date: Mar. 8, 2022

(87) PCT Pub. No.: WO2021/048020
PCT Pub. Date: Mar. 18, 2021

(65) Prior Publication Data
US 2022/0363602 A1    Nov. 17, 2022

Related U.S. Application Data

(63) Continuation-in-part of application No. PCT/EP2018/077049, filed on Oct. 4, 2018.

(30) Foreign Application Priority Data

Oct. 6, 2017  (EP) ..................................... 17195275
Sep. 9, 2019  (EP) ..................................... 19196116

(51) Int. Cl.
| C04B 18/24 | (2006.01) |
| B28B 1/16 | (2006.01) |
| B28B 1/52 | (2006.01) |
| B32B 7/02 | (2019.01) |
| B32B 13/02 | (2006.01) |
| B32B 13/04 | (2006.01) |
| C04B 14/06 | (2006.01) |
| C04B 14/18 | (2006.01) |
| C04B 28/02 | (2006.01) |
| C04B 40/00 | (2006.01) |
| C04B 111/00 | (2006.01) |
| E04C 5/07 | (2006.01) |

(52) U.S. Cl.
CPC ............... *C04B 18/24* (2013.01); *B28B 1/16* (2013.01); *B28B 1/522* (2013.01); *B28B 1/525* (2013.01); *B32B 7/02* (2013.01); *B32B 13/02* (2013.01); *B32B 13/04* (2013.01); *C04B 14/06* (2013.01); *C04B 14/185* (2013.01); *C04B 28/02* (2013.01); *C04B 40/0064* (2013.01); *E04C 5/073* (2013.01); *C04B 2111/00612* (2013.01)

(58) Field of Classification Search
CPC .. B32B 7/00–7/14; B32B 13/00–13/14; C04B 2/00–2290/20
See application file for complete search history.

(56) References Cited

U.S. PATENT DOCUMENTS

| 3,147,177 A | 9/1964 | Owens et al. |
| 5,188,889 A | 2/1993 | Nagatomi |
| 6,941,720 B2 * | 9/2005 | DeFord ................... E04C 2/043 52/783.17 |
| 2011/0023397 A1 | 2/2011 | Charvoz |

FOREIGN PATENT DOCUMENTS

| DE | 4233208 A1 | 4/1994 |
| DE | 102004063271 A1 | 7/2006 |
| EP | 0340620 A2 | 11/1989 |
| EP | 0585665 A1 | 3/1994 |
| EP | 1686220 A1 | 8/2006 |
| FR | 3026759 A1 | 4/2016 |
| WO | 02/31287 A1 | 4/2002 |
| WO | 2016/102116 A1 | 6/2016 |
| WO | 2019/068829 A1 | 4/2019 |

OTHER PUBLICATIONS

Sakota H et al., "Fiber-Reinforced Cement Articles," Chemical Abstracts, Chemical Abstracts Service (C A S), US, vol. 110, No. 9, May 1, 1989 (May 1, 1989), p. 340.

* cited by examiner

*Primary Examiner* — Prashant J Khatri
(74) *Attorney, Agent, or Firm* — Dilworth & Barrese, LLP

(57) ABSTRACT

The present invention relates to fiber cement products comprising a first layer, which first layer is covered by at least one second layer, characterized in that said first layer is the top layer and the first layer material has a density of between about 0.4 and about 0.9 g/cm³ inclusive, and at least comprises cement and between 1 wt % and 70 wt % (relative to the total dry weight of said first layer material) of a lightweight filler, and said at least one second layer is the bottom layer and covers only one of the main surfaces of the first layer, thereby forming a bi-layered fiber cement product, wherein the second layer material has a density of between about 0.9 and about 1.4 g/cm³ inclusive, and at least comprises fibers and cement.

19 Claims, 3 Drawing Sheets

FIG. 1 (page 1 of 3)
| Test protocol | According to the invention<br>C1 | According to the invention after swiping<br>C2 | Reference<br>C3 | Reference after swiping<br>C4 |
|---|---|---|---|---|
| 1 |  |  |  | 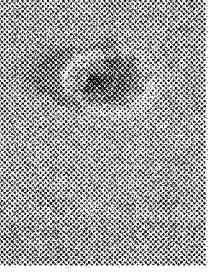 |
| 2 | 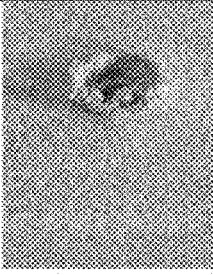 |  |  |  |
| 3 | 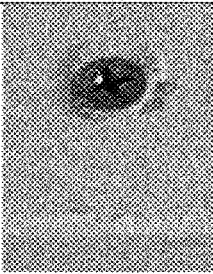 | 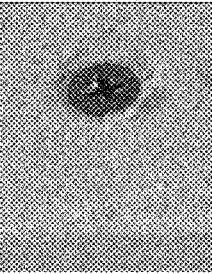 | 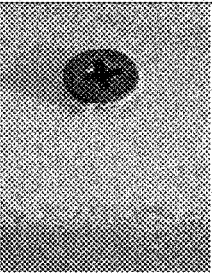 | 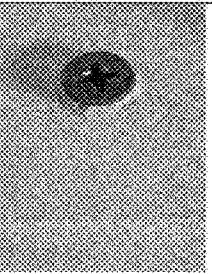 |
| 4 | 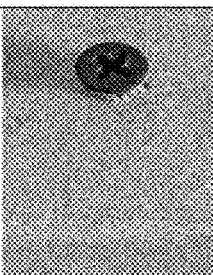 |  |  | 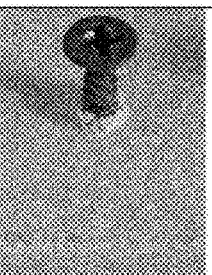 |

FIG. 1 (page 2 of 3)

| Test protocol | According to the invention<br>C1 | According to the invention after swiping<br>C2 | Reference<br>C3 | Reference after swiping<br>C4 |
|---|---|---|---|---|
| 5 | | | | |
| 6 | | | | |
| 7 | | | | |
| 8 | | | | |

FIG. 1 (page 3 of 3)
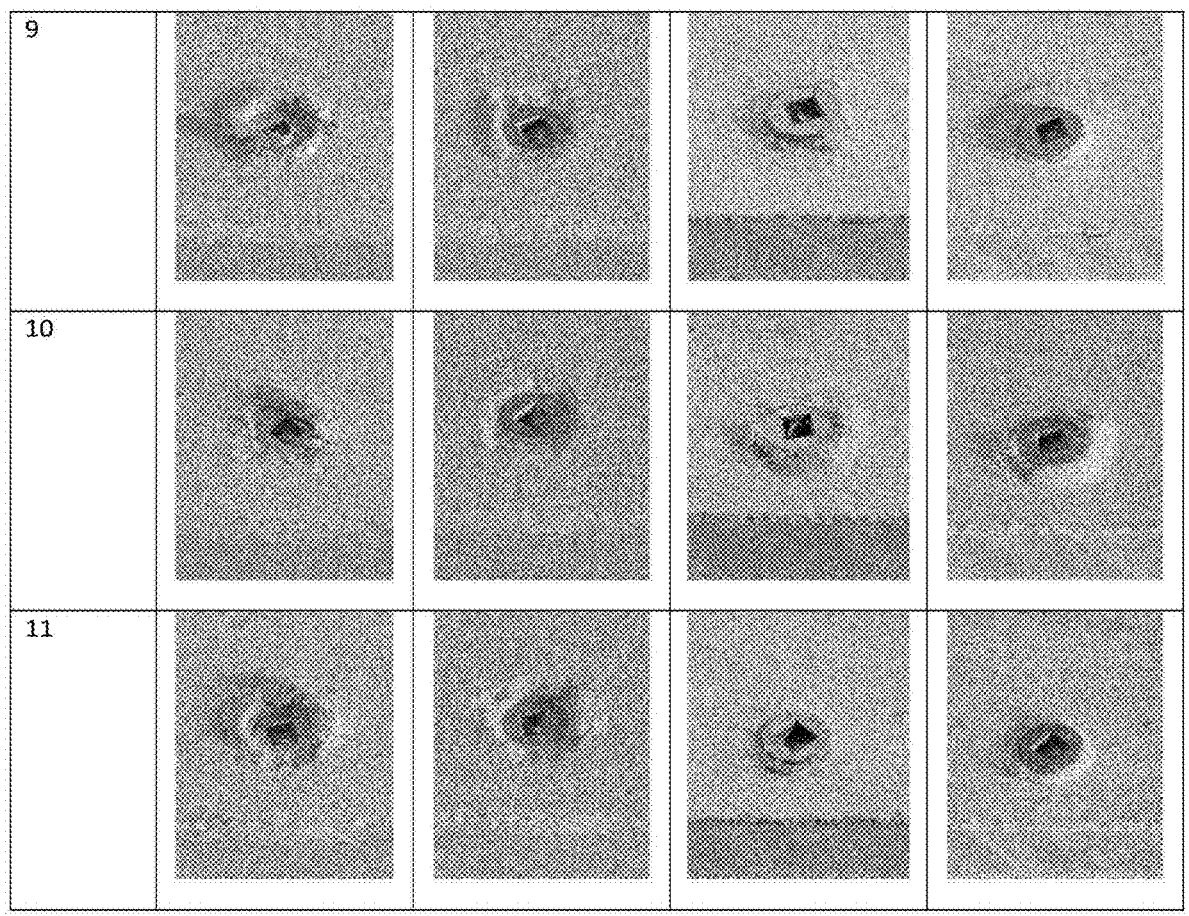

FIBER CEMENT PRODUCTS AND METHODS FOR THE PRODUCTION THEREOF

FIELD OF THE INVENTION

The present invention relates to fiber cement products comprising at least two layers, wherein the two layers each have a different density. The present invention further relates to methods for the manufacturing of these fiber cement products as well as to uses of these fiber cement products in the building industry and a building system comprising the fiber cement products.

BACKGROUND OF THE INVENTION

Fiber cement products, essentially consisting of water, cement and fibers, have been used for buildings since the nineteenth century and have a typical density of between about 1.1-1.9 g/cm$^3$. The variation in density is achievable by compression and dewatering of the fiber cement slurries used in manufacture and by varying the amount of fibers used. At these densities, the cement-based matrix has few voids, resulting in lower water absorption which has usually been considered necessary for good durability performance of cement matrices.

In comparison, the density of natural timber sheets typically ranges from about 0.7-0.9 g/cm$^3$ for dry hardwoods and from about 0.38-0.6 g/cm$^3$ for dry softwoods. Hence, typical fiber cement products are harder, heavier and have a reduced workability compared to timer-based products. Workability encompasses the ease with which the products are handled, installed and finished. Typically, timber-based products as well as fiber cement products are fixed by using nails or threaded fasteners, such as screws. While nails are usually easier and faster to install, screws have stronger holding abilities, deliver a higher tensile strength than nails and can draw pieces together. However, due to the high density and hardness of fiber cement products, even screws with sharp tips are hard to start. Furthermore, when installing fiber cement products using screws, excess fiber cement material collects around the screw head which makes a smooth finishing of the fiber cement boards difficult or even impossible.

In the prior art this problem is solved by pre-drilling clearance holes or by removing the excess fiber cement material by sanding the fiber cement products before the finishing step. However, this makes the installation and finishing of fiber cement products, in particular by using screws, a very labor-intensive job.

Therefore, there is a need for improved fiber cement products which have a better workability, are easier to install and easier to finish, in particular when screws are used during installation, while retaining excellent mechanical performance, durability, fire resistance, rot proof and water resistant properties.

SUMMARY OF THE INVENTION

The inventors have now surprisingly found that it is possible to provide fiber cement products fulfilling the above-mentioned needs. Thus, the primary object of the present invention is to provide fiber cement products having an improved workability while retaining a good mechanical performance and good water-resistant properties.

In this respect, the present inventors have achieved to develop fiber cement products containing at least two different fiber cement materials. In particular, the fiber cement products of the present invention at least comprise a first layer or top layer, which is made of a low-density fiber cement composition comprising at least one lightweight filler, and a second layer or bottom layer, which is made of a fiber cement composition having a medium to high density.

In a first aspect, the present invention provides fiber cement products comprising a first layer and a second layer characterized in that:
  the first layer is the top layer and the first layer material at least comprises cement and a lightweight filler and has a density in the range from about 0.4 to about 0.9 g/cm$^3$, and
  the second layer is the bottom layer and covers only one of the main surfaces of the first layer wherein the second layer material at least comprises fibers and cement and has a density in the range from about 0.9 to about 1.4 g/cm$^3$.

The inventors have found that the weight of the fiber cement products of the present invention is reduced whereas the mechanical, fire-resistant and water-resistant properties are the same or even improved when compared to fiber cement products known in the art. The inventors have further surprisingly found that the fiber cement products of the present invention are much easier to install, when using screws, and are less labor intensive to finish. Although there is some excess fiber cement material that collects around the screw head, the excess material can easily be removed by brushing or rubbing over the screw head without the need of more aggressive and labor-intensive methods such as sanding. The inventors have further surprisingly found that during installation of fiber cement products of the present invention, screws are able to penetrate the product more easily and are easier to start.

In a second aspect, the present invention provides methods for the production of fiber cement products as defined herein, at least comprising the steps of:
  i) Providing a first cementitious material at least comprising cement and a lightweight filler and having a density in the range from about 0.4 to about 0.9 g/cm$^3$,
  ii) Providing a second fiber cement material at least comprising fibers and cement and having a density in the range from about 0.9 to about 1.4 g/cm$^3$, and
  iii) Assembling the first cementitious material and the second fiber cement material to obtain a fiber cement product comprising a first layer of the first cementitious material and a second layer of the second fiber cement material.

In a third aspect, the present invention provides uses of a fiber cement product as defined herein as a building product.

In a fourth aspect, the present invention provides a building system comprising at least two fiber cement products as defined herein jointed to each other, thereby forming a building system. The inventors have surprisingly found that a building system comprising the fiber cement products according to the present invention, such as fiber cement boards, is much less prone to cracking, in particular to cracking in the joint area where the fiber cement products are jointed together, thereby exhibiting a more durable, crack free joint.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. The reference figures quoted below refer to the attached drawings.

BRIEF DESCRIPTION OF THE DRAWINGS

FIG. 1 shows samples after performing test protocols.

DETAILED DESCRIPTION

It is to be noted that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B.

Throughout this specification, reference is made to "one embodiment" or "an embodiment". Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The following terms are provided solely to aid in the understanding of the invention.

As used herein, the singular forms "a", "an", and "the" include both singular and plural referents unless the context clearly dictates otherwise.

The terms "comprising", "comprises" and "comprised of" as used herein are synonymous with "including", "includes", "having", "has" or "containing", "contains", and are inclusive or open-ended and do not exclude additional, non-recited members, elements or method steps.

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The terms "predetermined" and "predefined" as used herein when referring to one or more parameters or properties generally mean that the desired value(s) of these parameters or properties have been determined or defined beforehand, i.e. prior to the start of the process for producing the products that are characterized by one or more of these parameters or properties.

"At least one" as used herein when referring to parts, entities, constituents, components, elements, objects etc. is intended to be construed as one or more parts, entities, constituents, components, elements, objects etc., such as one, two, three, four, five, six, seven, eight, nine, ten, or more parts, entities, elements, objects etc.

"A part" as used herein refers to an entity, constituent, component, element and/or object of a larger whole comprising two or more entities, constituents, components, elements and/or objects.

"At least one part of material" as used herein, such as for example in the expressions "at least one part of lightweight material" or "at least one part of fiber cement material", means that one or more parts of are made from or are consisting of this material. In this respect, "at least one part of lightweight material" means that one or more parts of a larger multi-part whole are made from or are consisting of lightweight material. In the same way, "at least one part of fiber cement material" means that one or more parts of a larger multi-part whole are made from or are consisting of fiber cement material.

The terms "(fiber) cementitious slurry" or "(fiber) cement slurry" as referred to herein generally refer to slurries at least comprising water, fibers and cement. The fiber cement slurry as used in the context of the present invention may also further comprise other components, such as but not limited to, limestone, chalk, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, pigments, anti-foaming agents, flocculants, lightweight fillers and other additives. In the context of the processes of the present invention, the fiber cement slurry can thus be provided by one or more sources of at least cement, water and fibers. Optionally, these one or more sources of at least cement, water and fibers may operatively be connected to a continuous mixing device constructed to form a cementitious fiber cement slurry.

"Fiber(s)" present in the fiber cement products or fiber cement slurry as described herein may be for example process fibers and/or reinforcing fibers which may be organic fibers such as but not limited to cellulose fibers and/or synthetic fibers such as but not limited to polyvinyl-alcohol, polyacrilonitrile, polypropylene, polyamide, polyester, polycarbonate or mixtures of two or more thereof.

In particular embodiments, when using cellulose fibers or the equivalent of waste paper fibers, a minimum of about 2 wt %, such as at least about 3 wt %, such as at least about 4 wt % of these cellulose fibers (compared to the total initial dry weight of the slurry) may be used. In further particular embodiments, when exclusively cellulose fibers are used, between about 4 wt % to about 12 wt %, such as more particularly, between about 7 wt % and about 10 wt % of these cellulose fibers (compared to the total initial dry weight of the slurry) may be used. If cellulose fibers are replaced by short mineral fibers such as rock wool, it is most advantageous to replace them in a proportion of 1.5 to 3 times the weight, in order to maintain approximately the same content per volume. In long and cut fibers, such as glass fiber rovings or synthetic high-modulus fibers, such as polypropylene, polyvinyl acetate, polycarbonate or acrylonitrile fibers the proportion can be lower than the proportion of the replaced cellulose fibers. The fineness of the fibers (measured in Shopper-Riegler degrees, DEG SR herein after) is in principle not critical to the processes of the invention. Yet in particular embodiments, where autoclave-cured fiber cement products are envisaged, it has been found that a range between about 15 DEG SR and about 45 DEG SR can be particularly advantageous for the processes of the invention.

"Cement" present in the fiber cement products or fiber cement slurry as described herein may be for example but is not limited to Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

"Binder" or "mineral binder" or "hydraulic binder" as used herein may refer, without limitation, to cement, mixtures of cement and quartz sand, mixtures of cement and slaked lime $(Ca(OH)_2$ and optionally quartz or mixtures of slaked lime and quartz flour.

"Fiber cement product" as used herein generally refers to any object or product comprising fiber cement material.

"Fiber cement material" refers to a material essentially consisting of a fiber cement composition, which composition at least comprises fibers and cement.

The terms "first layer", "top layer", "low density layer" or "low density first layer" as used interchangeably herein refer to the low density layer of the fiber cement products of the present invention, which layer comprises a first cementitious material or first layer material and has an average density in the range from about 0.4 to 0.9 g/cm³ and is covered on at least 60% of only one of its main surfaces by a high-density second layer (also referred to herein as "the bottom layer").

The terms "second layer", "bottom layer", "bottom fiber cement layer", "high density layer" or "high density second layer" as used interchangeably herein refer to the high density layer of the fiber cement products of the present invention, which layer comprises a second fiber cement material or second layer material and has an average density in the range from about 0.9 to 1.4 g/cm³ and covers at least 60% of only one main surface of the first layer.

When generally referring to a "fiber cement layer" herein, it is intended to refer to any substantially flat, optionally substantially rectangular, layer or cake essentially consisting of a fiber cement composition and having a thickness of at least about 0.2 mm, in particular between about 0.5 mm and 200 mm, more particularly between about 1 mm and about 150 mm, most particularly between about 2 mm and about 100 mm.

A "Hatschek fiber cement layer" or a "Hatschek layer" as interchangeably used herein refers to a fiber cement layer (as defined herein), which is produced according to a Hatschek process, which at least comprises the steps of:
(i) building a fiber cement film on a sieve, which rotates in contact with a fiber cement slurry in a vat;
(ii) transferring the fiber cement film from the sieve to a felt transport belt, and
(iii) accumulating the fiber cement film on an accumulator roll via the felt transport belt.

A "non-Hatschek fiber cement layer" or a "non-Hatschek layer" as interchangeably used herein refers to a fiber cement layer (as defined herein), which is formed according to a fiber cement layer production process other than a conventional Hatschek process.

In the context of the present invention, the use of the term "fiber cement film" refers to such a thin layer of fiber cement being applied onto the felt transport belt by one or more sieves rotating in a fiber cement slurry that is present in one or more vats of the Hatschek process. As may be understood from the aforementioned, series of thin fiber cement layers are produced on the one or more sieves from the Hatschek machine and subsequently superimposed and transferred from the one or more sieves to the transport belt, resulting in one or more uncured Hatschek fiber cement layers after accumulation on an accumulation roll. Thus, it will be clear that, when referring to "a fiber cement film" in the context of the present invention, it is to be understood that this term encompasses, where applicable, both the meaning of one single fiber cement film having a thickness of between about 0.01 mm and about 0.9 mm, such as in particular between about 0.05 mm and about 0.5 mm, such as between about 0.1 mm and about 0.4 mm, such as about 0.3 mm. (i.e. one thin layer of fiber cement also called a mono-layer, a single layer or a primary layer, that is applied onto the felt transport belt by a sieve from a vat of the Hatschek process) as well as the meaning of a layer comprising two or more superimposed fiber cement layers, each having a thickness of between about 0.01 mm and about 0.9 mm, such as in particular between about 0.05 mm and about 0.5 mm, such as between about 0.1 mm and about 0.4 mm, such as about 0.3 mm (i.e. two or more superimposed thin layers of fiber cement applied onto the felt transport belt by two or more sieves from a vat of the Hatschek process). The skilled person will understand, depending on the particular configuration of the Hatschek section, that when referring to processes of the invention in general both meanings of the term "fiber cement film" as described above will be applicable, while in more particular embodiments only one of both meanings are applicable. For instance, in a particular case where only one sieve is used in the Hatschek section for performing the processes of the invention, "a fiber cement film" as used herein means only one single layer having a thickness of between about 0.01 mm and about 0.9 mm that is applied onto the felt transport belt by the sieve from a vat of the Hatschek process. On the other hand, where two or more sieves are used in the Hatschek section for performing the processes of the invention, "a fiber cement film" as used herein means a superposition of two or more single layers, each having a thickness of between about 0.01 mm and about 0.9 mm, which are applied onto the felt transport belt by the sieve from a vat of the Hatschek process.

A "(fiber cement) sheet" as used herein, also referred to as a panel or a plate, is to be understood as a substantially flat, usually rectangular element, a fiber cement panel or fiber cement sheet being provided out of fiber cement material. The panel or sheet has two main faces or surfaces, being the surfaces with the largest surface area. The sheet can be used to provide an outer surface to walls, both internal as well as external a building or construction, e.g. as façade plate, siding, ceiling board, flooring panel etc.

The term "lightweight material" as used herein refers to any material that, when used as an ingredient, component or constituent in a (building) product (formulation), adds a significant amount of volume without adding a significant amount of weight. Lightweight materials as referred to herein have a density of between about 0.01 to about 0.90 g/cm³.

The term "filler(s)" as used herein refers to any material(s) interacting with binders in composites, such as cement, which improve particle packing and give the composite other properties. The use of fillers also allows to reduce the amount of cement to be used in cementitious products without resulting in loss of mechanical strength. "Lightweight filler(s)" as used herein refers to filler(s) made from or consisting of lightweight material.

The term "aggregate" as used herein refers to a broad category of coarse particulate material used in construction, including sand, gravel, crushed stone, slag, recycled concrete and geosynthetic aggregates. A category of aggregate materials can be used as specialty lightweight aggregates, such as but not limited to clay, pumice, (expanded) perlite, (expanded) vermiculite, expanded polystyrene, extruded polystyrene, foam, concrete foam, pumice, calcium silicate hydrate gel (CSH gel), microspheres, cenospheres (ceramic microspheres) and/or alkali resistant expanded glass spheres/beads, xonotlite, expanded shale and mixtures of two or more thereof.

"Density" as used in the context of the present invention refers to the average density of a fiber cementitious material or to the average density of a fiber cement product and represents the mass per unit volume (expressed in g/cm³ herein) of the fiber cement material or fiber cement product. The density as referred to herein can be measured by any suitable standard test known in the art. For example, a sample of the fiber cement material or fiber cement product can be taken and the volume of the specimen can be determined by any method capable of giving a result accurate to within 2% of the results obtained by the water displacement method.

Water displacement test can be performed per Standard Test Methods C20, in which the volume (V) of the test specimen is obtained in cubic centimeters by subtracting the suspended weight (W) from the saturated weight (S), both in grams as follows:

$$V = W - S$$

where:
V=volume, cm³,
W=saturated weight, g, and
S=suspended weight, g.

This assumes that 1 cm³ of water weighs 1 g. This is true within about three parts in 1000 for water at room temperature. Suspended weight (S) is obtained for each test specimen by suspending the specimen in a loop or halter of AWG gage No. 22 (0.644 mm) copper wire hung from one arm of the balance. The balance shall be previously counter balanced with the wire in place and immersed in water to the same depth as is determining the suspended weight, blot each specimen lightly with a moistened smooth linen or cotton cloth to remove all drops of water from the surface, and determine the saturated weight (W) in grams by weighing in air to the nearest 0.1 g.

The density of the fiber cement specimen can then be calculated in g/cm³ using the equation:

$$\text{Density} = W/V \text{ in grams per cubic centimeter (g/cm}^3\text{)}$$

where:
W=dry mass of specimen, g, and
V=volume, cm³.

The term "water-permeable" as used herein when referring to a water-permeable (region of a) transport belt generally means that the material of which the water-permeable (region of the) belt is made allows water to flow through its structure to a certain extent.

The "water-permeability" as used herein when referring to the water-permeability of a (region of a) transport belt generally refers to the extent or degree to which the material of which the water-permeable (region of the) belt is made, allows water to flow through its structure. Suitable materials for water-permeable transport belts are known to the person skilled in the art, such as but not limited to felts.

The invention will now be further explained in detail with reference to various embodiments. It will be understood that each embodiment is provided by way of example and is in no way limiting to the scope of the invention. In this respect, it will be clear to those skilled in the art that various modifications and variations can be made to the present invention without departing from the scope or spirit of the invention. For instance, features illustrated or described as part of one embodiment, can be used in another embodiment to yield a still further embodiment. Thus, it is intended that the present invention covers such modifications and variations as encompassed within the scope of the appended claims and equivalents thereof.

First Layer

Thus, the fiber cement products according to the present invention comprise a first layer of low-density cementitious material, which at least comprises cement and a lightweight filler and has a density in the range from about 0.4 to about 0.9 g/cm³.

The inventors have found that the low density first layer provides the fiber cement product with an improved workability in terms of weight but also in terms of easier installation and finishing. Without being bound to this theory, the inventors believe that the low density and thus softer, more flexible first layer or top layer allows fastening means, in particular threaded fastening means, such as screws, to penetrate the fiber cement product more easily. Hence, the driving of screws into the fiber cement product during installation will be easier to start and it will be easier to make the screws flush with the surface of the fiber cement product. When the screws are flush with the surface of the fiber cement product after installation, it is much easier to finish the top surface and the screws will be nearly invisible in the finished surface.

Furthermore, although some excess fiber cement material collects around the screw head while the screw is driven into the fiber cement product, it is easily removed by gently brushing or rubbing over the screw head and there is no need for more aggressive and more labor-intensive removal methods such as sanding. The inventors believe that this advantageous effect is caused by the soft and fluffy nature of the low density first layer.

When traditional fiber cement products are used it is more difficult to make the screws flush with the surface and the excess fiber cement material which collects around the screw head is impossible to remove by brushing or rubbing.

In one embodiment, the first layer of the fiber cement products according to the present invention has a density in the range from about 0.5 g/cm³ to about 0.8 g/cm³. In particular embodiments, the first layer of the fiber cement products according to the present invention has a density in the range from about 0.55 g/cm³ to about 0.75 g/cm³, such as of about 0.6 g/cm³ or of about 0.7 g/cm³.

In particular embodiments, the fiber cement products according to the present invention are characterized in that the first layer material comprises a lightweight filler in an amount in the range from 5 wt % to 75 wt %, relative to the total dry weight of the first layer material. In further particular embodiments, the fiber cement products according to the present invention are characterized in that the first layer material comprises a lightweight filler in an amount in the range from 5 wt % to 70 wt %, relative to the total dry weight of the first layer material, such as particularly from 10 wt % to 60 wt %, more particularly from 15 wt % to 50 wt %, most particularly from 20 wt % to 40 wt % of lightweight filler, relative to the total dry weight of the first layer material.

The choice of the lightweight filler in the first layer of the fiber cement product according to the present invention is not particularly limited. This lightweight filler may be a lightweight aggregate (as defined herein), such as but not limited to a masonry-lightweight aggregate and/or a structural lightweight aggregate.

In further particular embodiments, the fiber cement products according to the present invention are characterized in that the first layer material comprises a lightweight filler which is chosen from the group consisting of expanded perlite, expanded vermiculite, expanded polystyrene, extruded polystyrene, foam, concrete foam, calcium silicate hydrate gel (CSH gel), microspheres, cenospheres (ceramic microspheres) and (alkali resistant) expanded glass spheres/beads, xonotlite, expanded shale or any suitable combination thereof.

In particular embodiments, the fiber cement products according to the present invention are characterized in that the first layer material comprises a lightweight filler which is expanded perlite.

In further particular embodiments, the fiber cement products according to the present invention are characterized in that the first layer material comprises expanded perlite as a lightweight filler in an amount in the range from about 5 wt % to 40 wt %, such as from about 20 wt % to 40 wt %, relative to the total dry weight of the first layer material.

In other particular embodiments, the fiber cement products according to the present invention are characterized in that the first layer material comprises a lightweight filler which is expanded polystyrene. In further particular embodiments, the fiber cement products according to the present invention are characterized in that the first layer material comprises expanded polystyrene as a lightweight filler in an amount in the range from about 5 wt % to 30 wt %, relative to the total dry weight of the first layer material.

In certain other embodiments, the fiber cement products according to the present invention are characterized in that the first layer material comprises a lightweight filler which is expanded polystyrene. In further particular embodiments, the fiber cement products according to the present invention are characterized in that the first layer material comprises expanded polystyrene as a lightweight filler in an amount in the range from about 1 wt % to 30 wt %, such as in the range from about 1 wt % to 20 wt %, relative to the total dry weight of the first layer material.

In certain other embodiments, the fiber cement products according to the present invention are characterized in that the first layer material comprises a lightweight filler which is extruded polystyrene. In further particular embodiments, the fiber cement products according to the present invention are characterized in that the first layer material comprises extruded polystyrene as a lightweight filler in an amount in the range from about 1 wt % to 30 wt %, such as in the range from about 1 wt % to 20 wt %, relative to the total dry weight of the first layer material.

In particular embodiments, the fiber cement products according to the present invention are characterized in that the first layer material further comprises fibers.

In further particular embodiments, the fiber cement products according to the present invention are characterized in that the first layer material comprises fibers in an amount in the range from 0 wt % to 5 wt % relative to the total dry weight of the first layer material. In yet further particular embodiments, the fiber cement products according to the present invention are characterized in that the first layer material comprises fibers in an amount in the range from 1 wt % to 4 wt %, relative to the total dry weight of the first layer material, such as about 2 wt %, about 3 wt % or about 4 wt % of fibers relative to the total dry weight of the first layer material.

In particular embodiments, the fiber cement products according to the present invention are characterized in that the first layer material comprises cellulose fibers. In particular embodiments, the fiber cement products according to the present invention are characterized in that the first layer material comprises cellulose fibers in an amount in the range from 0 wt % to 5 wt %, relative to the total dry weight of the first layer material. In yet further particular embodiments, the fiber cement products according to the present invention are characterized in that the first layer material comprises cellulose fibers in an amount in the range from 1 wt % to 4 wt %, relative to the total dry weight of the first layer material, such as about 2 wt %, about 3 wt % or about 4 wt % of cellulose fibers, relative to the total dry weight of the first layer material.

In certain particularly preferred embodiments, the fiber cement products according to the present invention are characterized in that the first layer material comprises 0 wt % cellulose fibers and comprises at least 1 wt % of synthetic fibers having a length of between 2 and 12 mm and a thickness in the range from 0.1 dtex to 15 dtex, preferably in the range from 0.5 dtex to 5 dtex, most preferably of about 2 dtex.

In further particular embodiments, the fiber cement products according to the present invention are characterized in that the first layer material comprises chemical pulps, such as, but not limited to, pulps originating from a Kraft process.

In further particular embodiments, the fiber cement products according to the present invention are characterized in that the first layer material comprises mechanical pulps, such as, but not limited to, SGW pulp—Stone Groundwood pulp, PGW pulp—Pressure Groundwood pulp, RMP—Refiner Mechanical Pulp, TMP—Thermo Mechanical Pulp, CTMP—Chemi Thermo Mechanical Pulp, as it can be found in a recycled furnish.

In further particular embodiments, the fiber cement products according to the present invention are characterized in that the first layer material comprises recycled fiber cement waste, such as recycled autoclaved fiber cement waste, recycled air-cured fiber cement waste and/or milled or ground fiber cement waste.

The first layer material of the fiber cement products according to the present invention further comprises cement, which can be any suitable cement type (as defined herein). In particular embodiments, the first layer material of the fiber cement products according to the present invention comprises cement in an amount of 5 wt % to 85 wt %, relative to the total dry weight of the first layer material, such as 5 wt % to 80 wt %. In further particular embodiments, the first layer material of the fiber cement products according to the present invention comprises cement in an amount of 10 wt % to 75 wt %, relative to the total dry weight of the first layer material. In yet further particular embodiments, the first layer material of the fiber cement products according to the present invention comprises cement in an amount of 20 wt % to 70 wt %, such as more particularly 30 wt % to 65 wt %, such as most particularly 40 wt % to 60 wt %, relative to the total dry weight of the first layer material, such as 20 wt % to 75 wt %.

Second Layer

It is understood that the first layer, as detailed above, is covered (on at least 60% of one of its main surfaces) by a second layer, which at least comprises fibers and cement. The first layer material has a lower density than the second layer fiber cement material. It is further understood that all definitions and preferences, as described above, equally apply for all further embodiments, as described below.

The inventors have found that the high-density second layer ensures that the fiber cement end product retains the same or similar mechanical strength and the same or similar water resistance properties compared to a fiber cement product, which would completely and exclusively consist of such high-density fiber cement material(s). Furthermore, the second layer ensures that the screws are firmly anchored into the fiber cement product and that the screws do not easily wear out the fiber cement material surrounding them when the fiber cement products are subjected to stress after installation.

In one embodiment, the second layer of the fiber cement products according to the present invention has a density in the range from about 0.95 g/cm$^3$ to about 1.3 g/cm$^3$, such as of about 1.0, 1.05, 1.1, 1.15, 1.20 or 1.25 g/cm$^3$.

In particular embodiments, the present invention provides fiber cement products comprising a first layer material, which first layer material is covered by a second layer, characterized in that:
   the first layer material at least comprises cement and a lightweight filler and has a density in the range from about 0.4 to about 0.9 g/cm$^3$, and
   the second layer material at least comprises fibers and cement and has a density in the range from about 1.0 to about 1.4 g/cm$^3$.

In particular embodiments, the fiber cement products according to the present invention are characterized in that the second layer material comprises cellulose fibers in an amount in the range from 6 wt % to 10 wt %, relative to the total dry weight the second layer material. In further particular embodiments, the fiber cement products according to the present invention are characterized in that the second layer material comprises cellulose fibers. In yet further particular embodiments, the fiber cement products according to the present invention are characterized in that the second layer material comprises cellulose fibers in an amount in the range from 7 wt % to 9 wt %, relative to the total dry weight the second layer material, such as about 7 wt %, about 8 wt % or about 9 wt % of cellulose fibers relative to the total dry weight of the second layer material.

The second layer material further at least comprises cement, which can be any suitable type of cement (as defined herein). In particular embodiments, the second layer material of the fiber cement products according to the present invention comprises cement in an amount of 5 wt % to 95 wt %, relative to the total dry weight of the second layer material, such as 5 wt % to 90 wt %. In further particular embodiments, the second layer material of the fiber cement products according to the present invention comprises cement in an amount of 10 wt % to 90 wt %, relative to the total dry weight of the second layer material. In yet further particular embodiments, the second layer material of the fiber cement products according to the present invention comprises cement in an amount of 20 wt % to 85 wt %, such as more particularly 30 wt % to 85 wt %, such as most particularly 40 wt % to 80 wt %, relative to the total dry weight of the second layer material. In even further particular embodiments, the second layer material of the fiber cement products according to the present invention comprises cement in an amount of 50 wt % to 85 wt %, such as more particularly 55 wt % to 85 wt %, such as most particularly 60 wt % to 70 wt %, relative to the total dry weight of the second layer material.

According to particular embodiments, the first layer material and/or the second layer material of the fiber cement products according to the invention optionally comprise further components. Said further components are known to those skilled in the art and may include, but are not limited to, water, sand, silica sand flour, condensed silica fume, microsilica, fly-ashes, amorphous silica, ground quartz, the ground rock, clays, pigments, kaolin, metakaolin, blast furnace slag, carbonates, pozzolans, aluminium hydroxide, wollastonite, mica, perlite, calcium carbonate, and other additives (e.g. colouring additives) and any suitable combinations thereof. It will be understood that each of these components is present in suitable amounts, which depends on the type of the specific fiber cement product and can be determined by the person skilled in the art without any undue burden. In particular embodiments, the total quantity of such further components is preferably lower than 70 wt %, relative to the total initial dry weight of the first layer material and/or the second layer material.

According to particular embodiments, the first layer material and/or the second layer material of the fiber cement products according to the invention optionally comprise further additives to enhance the appearance, easiness of production, storage, transport, handling and/or performance of the product. Said further additives are known to those skilled in the art and may include, but are not limited to, dispersants, plasticizers, antifoam agents and flocculants. In particular embodiments, the total quantity of further additives is preferably from about 0.1 wt % to about 1 wt % relative to the total initial dry weight of the first layer material and/or the second layer material.

In particular embodiments, the present invention provides fiber cement products, where the first layer is completely (i.e. all over one of its main surfaces) covered by a second layer of fiber cement material, thereby forming a bi-layered fiber cement material.

The skilled person will understand that, in all embodiments, the second layer partially or completely covers only one of the main surfaces of the first layer and can never cover both main surfaces since then one could not refer to the first layer as the top layer and to the second layer as the bottom layer. The skilled person will further understand that the terms top and bottom layer are not important in relation to the manufacturing of the fiber cement products, however, they are important when the fiber cement products are in use. In practice, the fiber cement products according to the present invention are generally installed onto a substrate such as a wall. Here it is important that the bottom layer, or second layer, faces the substrate while the first layer remains on top and is also the layer that may be further finished, and which usually remains the visible side of the fiber cement product.

In certain other embodiments, the invention provides fiber cement products, where the first layer is partially covered by the second layer. In such embodiments, about 60% to about 100%, such as about 95%, of one of the main surfaces of the first layer is covered by the second layer. In further embodiments, the invention provides fiber cement products, where one of the main surfaces of the first layer is essentially completely covered by the second layer, i.e. in these embodiments, about 80% to about 100%, such as about 95%.

In particular embodiments, the fiber cement products according to the present invention are flat (or at least substantially flat) multi-layered fiber cement products, such as flat multi-layered boards, sheets, panels, sidings, planks, or plates. In such embodiments, the multi-layered fiber cement products of the present invention comprise a first layer, which is covered on one of its largest opposite surfaces by at least one second layer, characterized in that:

the first layer material at least comprises cement and a lightweight filler and has a density in the range from about 0.4 g/cm³ to 0.9 g/cm³, and the second layer material at least comprises fibers and cement and has a density in the range from about 0.9 g/cm³ to about 1.4 g/cm³.

In further particular embodiments, the fiber cement products according to the present invention are flat (or at least substantially flat) multi-layered fiber cement products, such as flat multi-layered boards, sheets, panels, sidings, planks, or plates. In such embodiments, the multi-layered fiber cement products of the present invention comprise a first layer, which is covered on one of its largest opposite surfaces by at least one second layer, characterized in that:

the first layer material at least comprises cement and a lightweight filler and has a density in the range from about 0.4 g/cm³ to 0.9 g/cm³, and the second layer material at least comprises fibers and cement and has a density in the range from about 1.0 g/cm³ to about 1.4 g/cm³.

In further particular embodiments, the fiber cement products according to the present invention are flat bi-layered fiber cement products, such as flat bi-layered boards, sheets, panels, sidings, planks, or plates. In these particular embodiments, the present invention provides flat bi-layered fiber cement products, characterized by the presence of a first layer having a density in the range from about 0.4 g/cm³ to about 0.9 g/cm³ inclusive, which first layer is covered on one of its two largest opposite surfaces (i.e. its largest lower surface or its largest upper surface) by one second layer having a density in the range from about 0.9 g/cm³ to about 1.4 g/cm³ inclusive.

In yet further particular embodiments, the present invention provides flat multi-layered fiber cement products, characterized by the presence of a first layer having a density in the range from about 0.4 g/cm³ to about 0.9 g/cm³, which first layer is covered on one of its largest opposite surfaces by a second layer having a density in the range from about 0.9 g/cm³ to about 1.4 g/cm³ which second layer is covered by at least one consecutive (i.e. overlapping) layer, each consecutive layer having a density in the range from about 0.9 g/cm³ to about 1.4 g/cm³.

In particular embodiments, each consecutive layer present in the flat multi-layered fiber cement products of the invention may have a different composition or may have the same composition as the second layer, as long as these fiber cement layers comprise at least fibers and cement and have a density in the range from 0.9 g/cm³ to 1.4 g/cm³. It is understood that all definitions and preferences for the second layer, as described above, equally apply for each of the consecutive layers covering the second layer.

In particular embodiments, the first layer present in the flat multi-layered or bi-layered fiber cement products of the invention has a thickness in the range from 1 mm to 100 mm, such as from 2 mm to 80 mm, such as from 3 mm to 60 mm, more particularly from 3 mm to 50 mm, most particularly a thickness of about 8 mm, of about 12 mm, of about 16 mm, of about 18 mm, or of about 40 mm.

In particular embodiments, the second and consecutive layers present in the flat multi-layered or bi-layered fiber cement products of the invention have a thickness in the range from 0.2 mm to 10 mm, such as from 0.5 mm to 5 mm, such as from 0.7 mm to 3 mm, more particularly from 0.8 mm to 2 mm, most particularly a thickness of about 1 mm. In particular embodiments, the second and consecutive layers present in the flat multi-layered or bi-layered fiber cement products of the invention may each have thicknesses which are the same or which are different.

In particular embodiments, the fiber cement products according to the present invention are flat (or at least substantially flat) multi-layered fiber cement products, such as flat multi-layered boards, sheets, panels, sidings, planks, or plates, having a thickness in the range from 1.4 mm to 60 mm, such as from 2 mm to 50 mm, such as from 5 mm to 40 mm, such as from 7 mm to 20 mm, more particularly from 9 mm to 13 mm, most particularly a thickness of about 10 mm or about 11 mm. The lengths and widths of the fiber cement products of the present invention are not critical to the invention and may in principle be any suitable lengths and widths, which are appropriate for a given application or use of these particular fiber cement products in the building industry.

The fiber cement products or sheets as referred to herein include roof, wall, ceiling or floor covering products made out of fiber cement, such as fiber cement sidings, fiber cement boards, flat fiber cement sheets, corrugated fiber cement sheets and the like. According to particular embodiments, the fiber cement products according to the invention can be roofing or façade elements, flat sheets or corrugated sheets.

According to further particular embodiments, the fiber cement products of the present invention are fiber cement sheets.

Method

It is understood that all definitions and preferences, as described above, equally apply for all further embodiments, as described below.

In a second aspect, the present invention provides methods for manufacturing fiber cement products as defined herein, at least comprising the steps of:

i) Providing a first cementitious material at least comprising cement and a lightweight filler and having a density in the range from about 0.4 g/cm³ to about 0.9 g/cm³, ii) Providing a second fiber cement material at least comprising fibers and cement and having a density of in the range from about 0.9 g/cm³ to about 1.4 g/cm³, and iii) Assembling the first cementitious material and the second fiber cement material to obtain a fiber cement product comprising a first layer made of the first cementitious material, which first layer covers a second layer made of the second fiber cement material.

In particular embodiments, the present invention provides methods for the production of bi- layered or multi-layered fiber cement products as described herein, the methods at least comprise the steps of:

i) Providing a cementitious layer made of a first cementitious material, which at least comprises cement and a lightweight filler and has a density in the range from about 0.4 g/cm³ to about 0.9 g/cm³, ii) Providing one or more fiber cement layers made of a second fiber cement material, which at least comprises fibers, cement and has a density in the range from about 0.9 g/cm³ to about 1.4 g/cm³, and iii) Assembling the cementitious layer of step (i) made of the first material and the one or more fiber cement layer of step (ii) made of the second material, so as to obtain a bi-layered or multi-layered fiber cement sheet comprising a first layer made of the first cementitious material, wherein the first layer covers one of the largest opposite surfaces of a second layer made of the second fiber cement material and which second layer is optionally covered by one or more consecutive layers made of the second fiber cement material.

Steps (i) and (ii) of the methods of the invention can be performed, either simultaneously or consecutively in any desired order. In these steps (i) and (ii), preparing a first cementitious material comprising at least cement and a lightweight filler and preparing a second fiber cement material comprising at least cement and fibers, can be done by any standard method known in the art.

For instance, first, a (fiber) cement slurry can be prepared by one or more sources of at least cement, water and optionally fibers. In certain specific embodiments, these one or more sources of at least cement, water and optionally fibers are operatively connected to a continuous mixing device constructed to form a cementitious fiber cement slurry.

In step (i), when using fibers, such as cellulose fibers or the equivalent of waste paper fibers, between about 0.1% and about 5% of the total slurry mass of these cellulose fibers is used. In addition, in step (i) between about 1% and 70%, more particularly between about 1% and 40%, of a lightweight filler (as defined and described herein) is added to the fiber cement slurry to obtain a cementitious material having a density of between about 0.4 $g/cm^3$ and 0.9 $g/cm^3$.

In step (ii), between about 5% and about 10% of the total slurry mass of these cellulose fibers is used, such as more particularly, between about 6% and about 10%.

The fineness of the fibers (measured in Shopper-Riegler degrees) is in principle not critical to the methods of the invention.

Once the at least two types of fiber cement slurries are obtained, the preparation of the first cementitious material of step (i) and the second fiber cement material of step (ii) can be executed according to any known procedure.

The process most widely used for manufacturing fiber cement materials is the Hatschek process, which is performed using a modified sieve cylinder paper making machine. Other manufacturing processes include the Magnani process, injection, extrusion, filter press, flow-on and others.

In particular embodiments, the fiber cement materials of the present invention are provided by using a combination of any of the known fiber cement product manufacturing processes, without limitation chosen from the group consisting of a Hatschek process, a Magnani process, an injection technology, an extrusion process, a filter press process and a flow-on process.

In further particular embodiments, the fiber cement materials of the present invention are provided by using a combination of Hatschek process(es) and/or one or more flow-on process(es). In these particular embodiments, steps (i) and/or (ii) of the methods according to the present invention each at least comprise the preparation of a (fiber) cement slurry followed by the formation of one or more uncured (fiber) cement layers (as defined herein) according to a Hatschek process and/or the formation of one or more uncured (fiber) cement layers (as defined herein) according to a flow-on process.

In yet further particular embodiments, steps (i) and (ii) of the methods of the present invention comprise forming one or more uncured fiber cement layers of a first cementitious material and forming one or more uncured fiber cement layers of a second fiber cement material, wherein the first cement material comprises at least cement and a lightweight filler and has a density in the range from 0.4 $g/cm^3$ to 0.9 $g/cm^3$ the second fiber cement materials comprises at least fibers and cement and has a density in the range from 1.0 $g/cm^3$ to 1.4 $g/cm^3$.

In this respect, forming one or more uncured fiber cement layers according to a Hatschek process at least comprises the steps of one complete cycle of a conventional Hatschek process as known in the art, i.e. (i) initial formation of a filter layer on the surface of a sieve; (ii) building of a very watery layer of fiber cement over the filter layer as the sieve rotates in contact with fiber cement slurry in a vat; (iii) low intensity dewatering of the wet film as it is transferred to a felt and (iv) high intensity dewatering of the film as it is passed through the nip of an accumulator roll.

The step of forming one or more uncured Hatschek fiber cement layers according to the invention is performed by means of a Hatschek machinery section, which is part of the apparatus according to the present invention (as further described herein).

Hatschek processes are generally known in the art and performed using a Hatschek machinery. As is known by the person skilled in the art, the fundamental part of a Hatschek machinery consists of one or more vats, in each of which vats a cylindrical sieve rotates in contact with a dilute water based fiber cement slurry. On the surface of each of the sieves, a filtering film and mineral materials including cement is formed. The sieve cylinder is mounted on an axle and driven by a an endless felt belt wrapped around the top of the sieve by a couch roller. The felt is threaded around a drive or anvil roller and a tail roller. The drive or anvil roller is pushed into hard contact with an accumulation roller. The actual Hatschek layers are formed as follows. As the clean sieve is pulled under the slurry in the vat, water from the slurry runs through the sieve depositing a soft porous film of fibers and cement on the surface of the sieve. The sieve carrying the film exiting the vat is brought into contact with the felt belt, which is stretched tightly across the sieve. This removes much of the water from the film by forcing it back through the film. The solid film floats on this layer of water and is transferred to the transport belt partly in response to the effect of removal of water and partly because the felt has a greater affinity for the film than the sieve. The film is carried on the transport belt to an accumulator roll to which it is transferred by further removal of water at high pressure. A sufficient number of films are wrapped on the accumulator roll to form a layer of the desired thickness. The stack of films is then removed from the roller and laid out flat to form the Hatschek layer. The action of dewatering successive films in contact with each other under pressure is sufficient to bind the films together to form a contiguous solid layer.

In particular embodiments, the one or more uncured fiber cement layers according to a Hatschek process can be formed directly on the felt transport belt and further on the accumulator roll of a Hatschek machine. In alternative embodiments, the one or more uncured fiber cement layers according to a Hatschek process can be formed on the surface of one or more preformed but uncured fiber cement layers, which were produced by a flow-on process using the felt transport belt or the accumulator roll of a Hatschek machine as a forming surface.

Furthermore, forming one or more uncured (fiber) cement layers according to a flow-on process at least comprises the step of discharging a (fiber) cement slurry composition, either directly or indirectly (as further specified herein), on a forming surface.

The forming surface can in principle be any surface that is substantially flat, corrugated or otherwise shaped but should at least be suitable to retain a liquid layer of (fiber)

cement slurry in place. The material of the forming surface should be alkali-resistant (i.e. resistant to a pH up to about 13). In particular embodiments, the forming surface is water-permeable. In further particular embodiments, the forming surface is a felt transport belt, such as a felt transport belt of a Hatschek machine. In yet further particular embodiments, the forming surface is an accumulator roll, such as an accumulator roll of a Hatschek machine.

In certain particular embodiments, the one or more uncured (fiber) cement layers, which are produced according to a flow-on process, are made by discharging a (fiber) cement slurry composition either directly onto a felt transport belt of a Hatschek machine or onto one or more previously formed Hatschek layers formed onto a felt transport belt of a Hatschek machine.

In certain particular embodiments, the one or more uncured (fiber) cement layers, which are produced according to a flow-on process, are made by discharging a (fiber) cement slurry composition either directly onto an accumulator roll of a Hatschek machine or onto one or more previously formed Hatschek layers formed onto an accumulator roll of a Hatschek machine.

In certain particular non-limiting embodiments, forming one or more uncured (fiber) cement layers by a flow-on process comprises discharging a flow of (fiber) cement slurry onto a forming surface using one or more flow-on distribution devices. In these particular embodiments, the (fiber) cement slurry distribution process at least comprises one or more flow-on distribution steps. Suitable flow-on distribution devices for the present invention at least comprise one or more flow-on dispensing systems with at least one outlet, thereby allowing the slurry to flow continuously onto the transport belt. In particular embodiments, the one or more outlets of the device are circularly or rectangularly shaped. In certain particular embodiments, the flow-on distribution devices further comprise one or more inlets, which are directly or indirectly operatively connected with a source of (fiber) cement slurry. Sources of (fiber) cement slurry can for example be but are not limited to one or more continuous (fiber) cement feeding systems or one or more continuous mixing devices constructed so as to form a cementitious (fiber) cement slurry and means for indirectly or directly feeding the slurry to one or more distribution devices.

In yet further particular embodiments, the length of the one or more flow-on dispensing systems for the continuous discharge of the cementitious slurry is at least 2.5 times the total width of the one or more inlets, such as at least 3.0 times, more particularly at least 3.5 times, such as at least 4.0 times, for instance at least 4.5 times or even at least 5.0 times the total width of the one or more inlets.

In certain particular embodiments, the step of continuously discharging the (fiber) cement slurry on the belt can be performed through at least one device which continuously and randomly spatters or sprays (droplets of) (fiber) cement slurry onto the transport belt. In these particular embodiments, the (fiber) cement slurry distribution process at least comprises one or more spattering and/or spraying distribution steps, such as at least one spattering and at least one spraying distribution step.

In these particular embodiments, the step of continuously discharging the (fiber) cement slurry on the belt can be performed through one or more spattering devices, such as for instance but not limited to one or more agitated brush systems, which continuously and randomly spatter (droplets of) (fiber) cement slurry onto the forming surface.

According to these particular embodiments, the one or more agitated brush-like devices, such as bristle-brush-like devices, are partly or entirely in contact with the (fiber) cement slurry, which is provided by one or more sources of (fiber) cement slurry. In this way, droplets of (fiber) cement slurry stick to and are picked up by the bristles of the one or more brush-like devices. Through agitation of the one or more brush-like devices, the droplets of (fiber) cement slurry are discharged from the different bristles of the one or more brush-like devices onto the forming surface. Thus, according to these particular embodiments, a plurality of bristles are used in a brush-like configuration, which is agitated (e.g. rotated, vibrated, etc.) so as to flick small droplets of the (fiber) cement slurry from the supply source onto the forming surface. Such dispensing devices may be in a brush form (such as a bristle-brush form) in roll or cylindrical configuration, or in a brush form (such as a bristle-brush form) in an upstanding array which, when agitated, flicks the pellets or droplets of (fiber) cement slurry from the edge of the bristles onto the forming surface.

In still further particular embodiments, the step of continuously discharging the (fiber) cement slurry onto the forming surface can be performed through one or more spraying systems, which continuously and randomly spray (droplets of) (fiber) cement slurry, provided by one or more sources of (fiber) cement slurry onto the forming surface. In these particular embodiments, the (fiber) cement slurry distribution process at least comprises one or more spraying distribution steps. Characteristics of spraying devices suitable for use in the present invention are not critical to the present invention as long as such devices are configured to discharge (fiber) cement slurry droplets from an atomizer or other device (part) onto the forming surface. The spraying devices for use in the present invention are known to the person skilled in the art and can be developed using routine techniques.

In yet further particular embodiments, the step of continuously discharging the (fiber) cement slurry onto the forming surface can be performed through any suitable combination of the one or more dispensing systems as described herein.

Thus, in particular embodiments, the step of continuously discharging the (fiber) cement slurry onto the belt can be performed consecutively by one or more flow-on distribution devices, continuously producing a (fiber) cement slurry flow, and/or one or more spattering distribution devices, which continuously and randomly spatter (droplets of) (fiber) cement slurry and/or one or more spraying distribution devices, which continuously and randomly spray (droplets of) (fiber) cement slurry onto the forming surface.

As a non-limiting example of these embodiments, the step of continuously discharging the (fiber) cement slurry on the belt can be performed consecutively by one or more flow-on distribution devices, which continuously and randomly produce a flow of cement slurry onto the forming surface, and/or one or more brush-like distribution systems and/or one or more spraying systems, which continuously and randomly spatter and/or spray, respectively, (droplets of) (fiber) cement slurry onto the forming surface.

In certain particular embodiments, the step of continuously discharging the (fiber) cement slurry on the belt can be performed consecutively by producing a flow of cement slurry onto the forming surface by means of one or more flow-on distribution devices, followed continuously and randomly spattering (droplets of) (fiber) cement slurry onto the forming surface by means of one or more brush-like dispensing systems. It will be understood that in these specific embodiments, the step of discharging (fiber) cement slurry can also be performed by first continuously and randomly spattering (droplets of) (fiber) cement slurry onto the forming surface using one or more brush-like dispensing systems, and then continuously and randomly producing a flow of cement slurry onto the forming surface by using one or more flow-on distribution devices.

In certain other particular embodiments, the step of continuously discharging the (fiber) cement slurry on the belt can be performed consecutively by continuously and randomly producing a flow of cement slurry onto the forming surface by means of one or more flow-on distribution devices, followed continuously and randomly spraying (droplets of) (fiber) cement slurry onto the forming surface by means of one or more spraying distribution systems. It will be understood that in these specific embodiments, the step of discharging (fiber) cement slurry can also be performed by first continuously and randomly spraying (droplets of) (fiber) cement slurry onto the forming surface using one or more spraying distribution systems, and then continuously and randomly producing a flow of cement slurry onto the forming surface by using one or more flow-on distribution devices.

In further particular embodiments, the step of continuously discharging the (fiber) cement slurry onto the forming surface can be performed consecutively by continuously and randomly producing a flow of cement slurry onto the transport belt by means of one or more flow-on distribution devices, followed by continuously and randomly spattering (droplets of) (fiber) cement slurry onto the forming surface by means of one or more brush-like distribution systems, further followed by continuously and randomly spraying (droplets of) (fiber) cement slurry onto the forming surface by means of one or more spraying distribution systems.

It will be understood that in these specific embodiments, the step of discharging (fiber) cement slurry can also be performed by consecutively producing a flow of cement slurry onto the forming surface by means of one or more flow-on distribution devices, followed by continuously and randomly spraying (droplets of) (fiber) cement slurry onto the forming surface by means of one or more spraying systems, further followed by continuously and randomly spattering (droplets of) (fiber) cement slurry onto the forming surface by means of one or more brush-like distribution systems.

Alternatively, in these specific embodiments, the step of discharging (fiber) cement slurry can also be performed by first continuously and randomly spraying (droplets of) (fiber) cement slurry onto the forming surface using one or more spraying systems, and then continuously and randomly either (i) first producing a flow of cement slurry onto the forming surface by using one or more flow-on distribution devices and then continuously and randomly spattering (droplets of) (fiber) cement slurry onto the forming surface using one or more brush-like distribution systems or (ii) first continuously and randomly spattering (droplets of) (fiber) cement slurry onto the forming surface using one or more brush-like distribution systems and then producing a flow of (fiber) cement slurry onto the forming surface by using one or more flow-on distribution devices.

Yet in an alternative scenario according to these specific embodiments, the step of discharging (fiber) cement slurry can also be performed by first continuously and randomly spattering (droplets of) (fiber) cement slurry onto the forming surface using one or more brush-like dispensing systems, and then continuously and randomly either (i) first producing a flow of cement slurry onto the forming surface by using one or more flow-on distribution devices and then continuously and randomly spraying (droplets of) (fiber) cement slurry onto the forming surface using one or more spraying systems or (ii) first continuously and randomly spraying (droplets of) (fiber) cement slurry onto the forming surface using one or more spraying systems and then producing a flow of (fiber) cement slurry onto the forming surface by using one or more flow-on distribution devices.

In the processes of the present invention, in order to obtain a (fiber) cement sheet with predetermined dimensions (i.e. thickness, length) and densities, the amount of cementitious slurry that is discharged onto the forming surface per time unit is controlled but will depend on different parameters, such as the type and predetermined dimensions of the final product to be made and the specific composition of the (fiber) cement slurry. It will be clear that the amount of cementitious slurry that is to be discharged onto the forming surface per time unit in order to obtain a certain (fiber) cement product can be determined by the skilled person using routine techniques.

In particular embodiments, the obtained one or more uncured (fiber) cement layers can optionally be treated in various ways. For instance, the (fiber) cement layers can be pressed by mechanical means, such as by a (cylindrical) belt press.

Alternatively, or additionally the obtained one or more uncured (fiber) cement layers can be treated with various agents to improve or alter their structure or properties. For example, the layers can be treated with a hydrophobic agent.

The processes according to the present invention further comprise the step (iii) of producing a fiber cement product by assembling the one or more uncured (fiber) cement layers (being Hatschek layers, non-Hatschek layers or a combination thereof), to obtain a fiber cement product comprising a first layer made of at least one layer of a first cementitious material, which first layer covers one of the largest opposite surfaces of a second layer made of a second fiber cement material, wherein:
  i) the first layer material at least comprises cement and a lightweight filler and having a density in the range from about 0.4 g/cm$^3$ to about 0.9 g/cm$^3$, and
  ii) the second layer material at least comprises fibers and cement and having a density in the range from about 0.9 g/cm$^3$ to about 1.4 g/cm$^3$.

In particular embodiments, the present invention provides methods for the production of fiber cement products as defined herein, at least comprising the steps of:
  i) Providing a first cementitious material at least comprising cement and a lightweight filler and having a density in the range from about 0.4 to about 0.9 g/cm$^3$,
  ii) Providing a second fiber cement material at least comprising fibers and cement and having a density in the range from about 1.0 to about 1.4 g/cm$^3$, and
  iii) Assembling the first cementitious material and the second fiber cement material to obtain a fiber cement product comprising a first layer made of the first cementitious material, which first layer covers a second layer made of the second fiber cement material.

Accordingly, step (iii) of the methods of the present invention comprises combining or assembling the first layer and the second layer as obtained in steps (i) and (ii), respectively, in such a way so as to produce a fiber cement product comprising a first layer made of the first cementitious material, which first layer covers (on at least 60% of the surface) a second layer made of the second fiber cement material.

Step (iii) of the processes of the present invention can be performed according to any manner known in the art.

In particular embodiments, the uncured (fiber) cement layers, as obtained in steps (i) and (ii) of the methods of the invention, may be superimposed either simultaneously with their formation step or alternatively after their formation step.

In particular embodiments, an uncured Hatschek (fiber) cement layer may be superimposed onto another layer during (i.e. simultaneously with) the Hatschek formation step in the processes of the present invention. Typically, a Hatschek layer is formed by producing a series of fiber cement films (primary layers or monolayers) and subsequently juxtaposing these on an accumulator roll. Thus, in these particular embodiments, superimposing the Hatschek layer onto another layer may be done during the accumulation step of the Hatschek formation process, whereby the Hatschek layer being formed is wrapped around one or more previously formed uncured Hatschek or uncured non-Hatschek layers already wound onto the accumulator roll. Accordingly, in these particular embodiments of the processes of the present invention, step iii) of superimposing in a predetermined order the one or more Hatschek (fiber) cement layers and the one or more non-Hatschek (fiber) cement layers, is performed on the accumulator roll.

In alternative embodiments, an uncured Hatschek layer may be superimposed onto another layer after the Hatschek formation step in the processes of the present invention. Typically, a Hatschek layer, after being formed on the accumulator roll, may be cut to a predetermined length. Thus, in these particular embodiments, superimposing the Hatschek layer onto another layer may be done after cutting the Hatschek layer and by subsequently transferring the Hatschek layer onto a previously formed (and optionally cut) uncured Hatschek or non-Hatschek layer or onto a stack of one or more previously formed (and optionally cut) uncured Hatschek and/or non-Hatschek layers.

In particular embodiments, an uncured non-Hatschek layer may be superimposed onto another layer during (i.e. simultaneously with) the (fiber) cement distribution step in the processes of the present invention. In the processes according to the invention, a non-Hatschek layer is formed by discharging a (fiber) cement slurry composition onto an endless transport belt by means of a flow-on a spattering or a spraying mechanism as described herein. Thus, in these particular embodiments, superimposing the Hatschek layer may be done during this flow-on, spattering or spraying fiber cement distribution step, whereby the non-Hatschek layer being formed is directly discharged onto one or more previously formed uncured Hatschek or uncured non-Hatschek layers present on the transport belt.

In alternative and/or additional embodiments, an uncured non-Hatschek layer may be superimposed onto another layer during (i.e. simultaneously with) the (fiber) cement distribution step in the processes of the present invention. In the processes of the present invention, after forming a non-Hatschek layer, this layer may be wrapped or accumulated onto an accumulator roll (also referred to as a forming cylinder). Thus, in these particular embodiments, superimposing the non-Hatschek layer may be done by wrapping the already formed non-Hatschek layer around one or more previously formed uncured Hatschek or uncured non-Hatschek layers already wound onto the accumulator roll.

In alternative and/or additional embodiments, an uncured non-Hatschek layer may be superimposed onto another layer after the (fiber) cement distribution step in the processes of the present invention. In the processes of the present invention, a non-Hatschek layer, after being formed, may be cut to a predetermined length. Thus, in these particular embodiments, superimposing the non-Hatschek layer may be done after cutting the layer and by subsequently transferring the non-Hatschek layer onto a previously formed (and optionally cut) uncured Hatschek or non-Hatschek layer or onto a stack of one or more previously formed and (and optionally cut) uncured Hatschek and/or non-Hatschek layers.

In particular embodiments of the processes of the present invention, after formation, each of the one or more Hatschek layers and each of the one or more non-Hatschek layers can be superimposed by winding each of the formed but uncured layers onto a forming cylinder in a predetermined order.

Thus, in principle, using the processes of the invention, a fiber cement product comprising any combination of uncured Hatschek and non-Hatschek layers can be produced by superimposing (as described herein) the produced uncured Hatschek and non-Hatschek layers in an arbitrary, although predefined, sequence.

It should be understood that the fiber cement products produced according to the processes of the invention are not limited as to the number of Hatschek or non-Hatschek layers comprised therein. Accordingly, the total number of Hatschek layers and non-Hatschek layers comprised in the fiber cement products of the present invention is at least two. In particular embodiments, the fiber cement products of the present invention may comprise at least three, at least four, at least five, at least six, at least seven, at least eight, at least nine, such as at least ten superimposed layers, which may be made of the same or of a different material, and each of which may be a Hatschek layer or a non-Hatschek layer. In further particular embodiments, the fiber cement products of the present invention may comprise at least two superimposed layers, of which each layer is made of a different material, and each layer may be a Hatschek layer or a non-Hatschek layer. In yet further particular embodiments, the fiber cement products of the present invention may comprise at least three superimposed layers, of which at least two layers are made of a different material, and each of which layer may be a Hatschek layer or a non-Hatschek layer.

The one or more Hatschek layers and the one or more non-Hatschek layers produced according to the processes of the invention are superimposed as soon as possible, i.e. during or immediately after formation, thereby avoiding any setting to occur between the layers as well as preventing any additional transport steps to be undertaken. The process is therefore easy to implement, highly flexible, cost-effective and efficient.

In certain particular embodiments, the processes according to the invention are continuous processes, meaning that the formation of Hatschek layers, non-Hatschek layers and fiber cement products is performed in a continuous way, i.e. without any interruption in between any of the different steps of the process and/or in between one cycle of a fiber cement product formation and a following cycle of a (i.e. another) fiber cement product formation.

In certain other particular embodiments, the processes according to the invention are discontinuous processes, meaning that the formation of Hatschek layers, non-Hatschek layers and fiber cement products is performed in a discontinuous way, i.e. being characterized by one or more interruptions occurring in between any of the different steps of the process and/or in between one cycle of a fiber cement product formation and a following cycle of a (i.e. another) fiber cement product formation.

While any combination of Hatschek layers and non-Hatschek layers can be made in order to obtain a fiber cement product according to the present invention, in certain particular embodiments, the fiber cement products according to the present invention are made by an alternate superimposition of a Hatschek layer onto a non-Hatschek layer or vice versa until the desired number of layers is reached. In these embodiments, each Hatschek formation step starts when a fiber cement distribution step ends and vice versa.

For instance, the fiber cement distribution step may be started by discharging a fiber cement slurry on a dewatering conveyor belt either through one or more mechanisms of flow-on, spattering and/or spraying. In addition, the fiber cement distribution step may be stopped by interrupting the flow-on, spattering and/or spraying of fiber cement slurry onto the conveyor belt.

The Hatschek formation step may for example be started by initiating the Hatschek machinery and bringing the Hatschek sieves into contact with fiber cement slurry. On the other hand, by way of example, the Hatschek step may be stopped by rinsing the rotating sieves of the Hatschek machine with water (instead of being in contact with a source fiber cement slurry), thereby avoiding the formation of a fiber cement film on each the sieves.

According to the invention, when the Hatschek formation step is stopped, i.e., for example when the water spray nozzles have started to rinse the sieves, the Hatschek build-up step is not immediately stopped since it is needed to wound the just formed series of fiber cement layers on the forming cylinder. The same applies for the fiber cement distribution step and build-up step. It is also clear from the aforementioned that the Hatschek formation step and the Hatschek build up step are separated steps operating concomitantly. The same applies for the fiber cement distribution formation and build-up steps.

The fiber cement products manufactured according to the processes of the present invention combine high strength (due to the presence of the medium- to high-density surface layers) and light weight, good thermal and acoustic insulating properties and enhanced workability (due to the presence of the low density first layer layer(s)).

As previously set out, the process according to the invention allows any desired design of a fiber cement product, which design is represented by a specific combination of Hatschek and non-Hatschek layers of the same or of a different composition According to particular embodiments, the thickness of each Hatschek or non-Hatschek layer can be monitored by tuning the duration of each Hatschek formation step or fiber cement distribution step (i.e. working through flow-on, spattering or spraying).

It will be clear to the skilled person that, in particular embodiments, one or more of the same compositions of (fiber) cement slurry or one or more different compositions of (fiber) cement slurry, and optionally one or more compositions other than (fiber) cement slurry compositions, can be used in each of the one or more Hatschek formation steps as well as in each of the one or more non-Hatschek formation steps (i.e. the latter being interchangeably used with the terminology "fiber cement distribution step(s)").

In this manner, by making use of one or more consecutively installed Hatschek formation systems and one or more fiber cement slurry distribution systems as described herein, fiber cement products comprising at least three or multiple layers having a specific and predetermined composition, can be manufactured by the processes of the invention.

According to certain particular embodiments of the invention, the resulting fiber cement products, obtainable by the processes described herein, comprise two layers, i.e. a lower and upper layer. In these particular embodiments, it may be envisaged that the at least one non-Hatschek layer formed according to the fiber cement distribution step comprises lightweight fillers to form a lightweight first layer. In addition, in these embodiments, the second layer having a higher density than the light weight first layer may be manufactured according to a Hatschek formation step and subsequently superimposed on one side of the first layer. In these particular embodiments, the Hatschek layer manufactured according to a Hatschek formation step, which layer represents the lower layer of the resulting product, preferably comprise substantially no lightweight fillers. On the other hand, the at least one non-Hatschek layer manufactured according to a fiber cement distribution step, which layer represents the first layer of the resulting product, preferably comprises a certain amount of lightweight fillers as described herein. These lightweight fillers are used to reduce the density of the at least one layer manufactured according to the fiber cement distribution step, and can, without limitation, be chosen from the group consisting of: expanded minerals such as perlite, vermiculite, microspheres, such as cenospheres (ceramic microspheres), alkali resistant expanded glass spheres/beads, polymeric microspheres or beads, expanded clay, xonotlite, expanded polystyrene hollow spheres etc. Preferred density modifiers are those with a closed porosity, such as microspheres, as they avoid water absorption of the cement sheet during manufacturing and consequently intensive drying. The amount of lightweight fillers is preferably in the range from from 1 to 70 wt %, such as between 1 and 40%, relative to the total dry weight of the composition used for the manufacture of the first layer. The use of lightweight fillers reduces the density (and hence the weight) of the layer manufactured according to the fiber cement distribution step, which results in easier handling and improved insulating properties. Preferably, the diameter of the lightweight fillers is in the range from between about 2 μm and about 2000 μm. Preferably, and in the present specific embodiments, the fiber cement product comprises a non-Hatschek first layer comprising no fibers, or at least less fibers than the one or more Hatschek second layers. The total amount of fibers in the first layer is preferably equal to or less than 15% by weight (wt %) relative to the initial total weight in the dry state of the hydraulic-setting composition, and more preferably this content is equal to or less than 10% by weight (wt %) relative to the initial total dry weight of the hydraulic-setting composition. The content of fibers in the first layer is most preferably between about 0 and 5% by weight (wt %) relative to the initial total dry weight of the hydraulic-setting composition.

In particular embodiments, the non-Hatschek layers and the Hatschek layers according to the present invention can, independently of each other, be composed of:
  a hydraulic binder, preferably present in a concentration of about 10 to about 80 wt % (relative to the initial total weight in the dry state of the composition), more preferably about 20 to about 50 wt %, and most preferably about 25 wt % to about 40 wt %;
  auxiliary materials including but not limited to inert fillers, additives improving or achieving specific product performance, pozzolans, processing aids, . . . optionally present in a concentration of about 0 to about 80 wt %, more particularly less than about 50 wt %; and optionally
  fibers, optionally present in a concentration of about 1 wt % to about 30 wt %.

The orientation of the fibers in layers manufactured according to the Hatschek process of the Hatschek formation step is primarily parallel to the planar series of fiber cement monolayers of the sheet, and especially in the machine loading direction. This planar orientation imparts the strength of the fiber reinforced cement building material.

In particular embodiments, the processes of the invention at least use one or more endless transport belts or conveyor belts, onto which the different Hatschek and optionally the different non-Hatschek layers of fiber cement are produced.

In particular embodiments, only the one or more Hatschek layers are formed on a dewatering conveyor belt, while the one or more non-Hatschek layers are formed on a forming surface other than a conveyor belt, such as for instance but not limited to a plate, a corrugated plate, a water-permeable flat material, a membrane, a fleece, an accumulator roll etc.

In particular embodiments, the one or more Hatschek layers and the one or more non-Hatschek layers are formed on the same type but on different, i.e. separately installed, dewatering conveyor belts.

In other particular embodiments, the one or more Hatschek layers and the one or more non-Hatschek layers are formed on the same dewatering conveyor belt, thereby increasing compactness of the process machinery and reducing transport costs during production.

In the processes of the present invention, the (fiber) cement slurry is continuously discharged by one or more distribution systems (as described herein), either directly or indirectly, onto the water-permeable transport belt.

Thus, in particular embodiments of the present invention, the (fiber) cement slurry is discharged by one or more distribution systems directly onto the surface of a water-permeable transport belt.

In other particular embodiments, the (fiber) cement slurry is discharged by one or more distribution systems onto a water-permeable transport belt in an indirect manner.

In these specific embodiments, the (fiber) cement slurry may first be discharged by one or more distribution systems onto a surface other than a water-permeable transport belt, such as for example but not limited to a transport belt which is not water-permeable, and only then further transported, deposited, or placed onto a water-permeable transport belt.

In other specific embodiments, the (fiber) cement slurry may be discharged indirectly onto the transport belt, by discharging it directly onto the surface of an already formed uncured Hatschek layer or onto the surface of an already formed uncured non-Hatschek layer, which uncured layers in their turn were either formed directly onto the (water-permeable) transport belt or indirectly onto the transport belt, such as for instance onto another preformed Hatschek or non-Hatschek-layer, which were again in their turn formed directly or indirectly onto the belt, etc. In this way, it will be understood that the superimposition of these different Hatschek and/or non-Hatschek layers results in an (fiber) cement product, which is composed of these different uncured Hatschek and/or non-Hatschek layers.

The processes according to the present invention may further comprise the step of cutting the fiber cement product obtained in step (c) to a predetermined length. Cutting the fiber cement sheet to a predetermined length can be done by any technique known in the art, such as but not limited to water jet cutting, air jet cutting or the like. The fiber cement sheets can be cut to any desirable length, such as but not limited to a length of between about 1 m and about 15 m, such as between about 1 m and about 10 m, more particularly between about 1 m and about 5 m, most particularly between about 1 m and about 3 m.

It will be understood by the skilled person that the processes of the present invention may further comprise additional steps of processing the produced fiber cement products.

For instance, in certain particular embodiments, during the processes of the present invention, the fiber cement slurry and/or the fiber cement sheets can undergo various intermediate treatments, such as but not limited to treatment with one or more hydrophobic agents, treatment with one or more flocculants, additional or intermediate pressing steps, etc.

It will be clear to the person skilled in the art that such intermediate processing steps can be introduced in the processes of the invention at any stage, i.e. before, during and/or after any of the different steps of the processes of the invention.

As soon as the fiber cement sheet is formed, it may optionally be trimmed at the lateral edges. The border strips can optionally be recycled through immediate mixing with the recycled water and directing the mixture to the mixing system again.

In particular embodiments of the present invention, the processes of the present invention may further comprise the step of producing a corrugated fiber cement sheet from the obtained fiber cement sheet. In these embodiments, the step of producing the corrugated fiber cement sheet may comprise for example at least the step of transferring the obtained fiber cement sheet to a corrugated sheet mold to form a corrugated fiber cement sheet. However, other techniques to produce corrugated sheets from flat sheets are known to the skilled person and may as well be used in combination with the processes of the present invention in order to obtain corrugated fiber cement sheets.

In particular embodiments, the processes of the invention may further comprise the step of curing the obtained fiber cement sheets. Indeed, after production, fiber cement products can be allowed to cure over a time in the environment in which they are formed, or alternatively can be subjected to a thermal cure (e.g. by autoclaving or the like).

In further particular embodiments, the "green" fiber cement sheet is cured, typically by curing to the air (air cured fiber cement products) or under pressure in presence of steam and increased temperature (autoclave cured). For autoclave cured products, typically sand is added to the original fiber cement slurry. The autoclave curing in principle results in the presence of 11.3 Å (angstrom) Tobermorite in the fiber cement product.

In yet further particular embodiments, the "green" fiber cement sheet may be first pre-cured to the air, after which the pre-cured product is further air-cured until it has its final strength, or autoclave-cured using pressure and steam, to give the product its final properties.

According to the process of the present invention, the resulting fiber cement sheet leaves the forming cylinder in an uncured and green state. Thus, the Hatschek and non-Hatschek layers are subsequently co-cured, thereby producing a strong interfacial layer bonding, which avoids delaminations during handling, cutting, installation and service; the assembly of the layers manufactured in the process according to the invention does not require any adhesive.

Advantageously, the resulting fiber cement sheet is autoclaved.

In particular embodiments of the present invention, the processes may further comprise the step of thermally drying the obtained fiber cement sheets. After curing, the fiber cement product being a panel, sheet or plate, may still comprise a significant weight of water, present as humidity.

This may be up to about 10 weight % even 15 weight % (wt %), expressed per weight of the dry product.

The weight of dry product is defined as the weight of the product when the product is subjected to drying at 105° C. in a ventilated furnace, until a constant weight is obtained.

In certain embodiments, the fiber cement product is dried. Such drying is done preferably by air drying and is terminated when the weight percentage of humidity of the fiber cement product is less than or equal to 8 weight %, even less than or equal to 6 weight %, expressed per weight of dry product, and most preferably between 4 weight % and 6 weight %, inclusive.

According to a third aspect, the present invention provides uses of the fiber cement products and fiber cement sheets according to the present invention in the building industry. In particular embodiments, the fiber cement sheets of the present invention can be used to provide an outer surface to walls, both internal as well as external a building or construction, e.g. as façade plate, siding, etc.

In further particular embodiments, the fiber cement sheets of the present invention are used as a building material and fixed to a substrate, such as a wall, with the second layer acting as a bottom layer facing the substrate and the first layer as the top layer which may be further finished.

The invention will now be further illustrated in detail with reference to the following Examples. It is to be understood that although preferred embodiments and/or materials have been discussed for providing embodiments according to the present invention, various modifications or changes may be made without departing from the scope and spirit of this invention.

EXAMPLES

It will be appreciated that the following examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

Example 1: Production of Fiber Cement Sheets According to a Specific Embodiment of the Invention A fiber cement sheet consisting of one Hatschek high density layer (also referred to herein as "second layer") having a thickness of about 9 mm and one non-Hatschek low density layer (also referred to herein as "first layer") with a thickness of about 3.5 mm was manufactured according to the process of the invention.

The formulation of the low density first layer comprised about 30 wt % relative to the total dry weight of the composition of perlite, while the high density layers are exempt of light weight fillers.

Table 1 shows the composition of the low density first layer material and the composition of the high density second layer material.

TABLE 1

|  | Low density (first layer) | | High density (second layer) | |
| --- | --- | --- | --- | --- |
|  | Absolute weight of each of the dry matter components (kg) | Relative weight compared to total weight of dry matter components (weight %) | Absolute weight of each of the dry matter components (kg) | Relative weight compared to total weight of dry matter components (weight %) |
| Cellulose 25° SR (Tasman) | 4.00 | 4.00 | 8.00 | 8.00 |
| Expanded perlite | 30.00 | 30.00 | | |
| Cement | 26.40 | 26.40 | 36.80 | 36.80 |
| Quartz | 39.60 | 39.60 | 55.20 | 55.20 |
| TOTAL | 100.00 | 100.00 | 100.00 | 100.00 |

Table 2 shows the densities of each of the layers (one low density first layer and one high density second layer).

TABLE 2

|  |  | Low density first layer | High density second layer |
| --- | --- | --- | --- |
| Density | [g/cm³] | 0.66 | 1.20 |
| Thickness | [mm] | 3.5 | 9.0 |
| E mod | MPa | 1688 | 8056 |

Example 2: Workability Tests of the Fiber Cement Sheets Produced According to the Specific Embodiment of Example 1

The bi-layered sample according to the present invention, further on called sample A, as produced in accordance with the description of Example 1, was further tested for its workability.

Comparative Example 1

A fiber reinforced cement Hatschek sheet with a thickness of about 15 mm having the same formulation as the Hatschek high density layers in Example 1, further on called comparative sample B, was tested on workability in the same way.

2.1 Screwing Test

In the Screwing test, typical fiber cement screws as shown in Table 3, were screwed into the sample A and the comparative sample B.

TABLE 3

| Screw number | Brand | Type of screw |
| --- | --- | --- |
| 1 | Eternit | Cedral screw: 4.2 * 45 mm for fixing on timber, square drive head |
| 2 | LaFarge gypsum | Universal LaDura screws: 3.9*45 mm; grey phosphated, flat cutting head, reverse fine thread, PH2 drive head |
| 3 | WEE FER bvba | GKP-screw 45 mm |

Automatic Screwing

In a first screwing method, tests 1 to 5, a weight of 5 kg or 10 kg was applied on a column drill (BDS Maschinen, MAB 485, speed 2).

Manual Screwing

In a second screwing method, tests 6 to 11, a battery powered manual screw driver was used (Makita, DDF484 18V). The manual screw driver can be regulated in applied torque by selecting a screw intensity between 1 to 21—arbitrary units on the selecting wheel. Three levels were selected: 13, 17 and 21.

The screwing test protocols 1 to 11 were performed on the bi-layered sample A, consisting of one high density second layer and one low density first layer, with compositions as indicated in Table 1. Also, a mono-layer comparative sample B, completely consisting of the high density second layer composition as indicated in Table 1, was incorporated in the test as a reference. The different test protocols and the remaining heights of the screws which did not enter into the sample, are summarized in Table 4 below.

TABLE 4

| Test protocol | Screwing method | Screw | Screw intensity |
|---|---|---|---|
| 1 | Automatic | 1 | 5 kg |
| 2 | Automatic | 1 | 10 kg |
| 3 | Automatic | 3 | 10 kg |
| 4 | Automatic | 2 | 5 kg |
| 5 | Automatic | 2 | 10 kg |
| 6 | Manual | 2 | 13 |
| 7 | Manual | 2 | 17 |
| 8 | Manual | 2 | 21 |
| 9 | Manual | 1 | 13 |
| 10 | Manual | 1 | 17 |
| 11 | Manual | 1 | 21 |

In case the screws did not penetrate the samples completely, it is clear that the screws penetrate further into sample A compared to the comparative sample B (i.e. the remaining height of the screw is shorter for samples A than for the comparative samples B). The remaining heights of the screws which did not penetrate in the sample completely, were measured and reported in Table 5 below.

TABLE 5

| Remaining height screw (in mm) | |
|---|---|
| Sample A (bilayer) | Comparative sample B |
| / | / |
| / | / |
| 1.0 | 2.1 |
| 3.9 | 13.4 |
| / | 5.4 |
| / | 1.2 |
| / | 1.5 |
| / | 1.8 |
| / | 1.1 |
| / | 1.0 |

It can be concluded that the bi-layered products as produced according to the methods of the present invention have an improved workability.

2.2 Removability of Fiber Cement Residue

When screws enter a fiber cement product, excess fiber cement material heaps up around the screw head which is clearly visible in the figures in column C1 and C3 of FIG. 1. To test the removability of this residue material, a household hand brush with polyester bristles was used to brush over the surface of the samples two times (two times a forward and a backward motion).

The figures in column C1 of FIG. 1 show the sample A, the sample according to the present invention, directly after performing the screwing test protocols 1 to 11.

The figures in column C3 of FIG. 1 show the comparative sample B directly after performing the screwing test protocols 1 to 11.

In these test protocols, the applied force on the screw remains constant. From comparing the figures in column C1 to the figures in column C3 of FIG. 1, it is clear that the screws penetrate further into sample A compared to the comparative sample B.

The figures in column C2 of FIG. 1 show the sample A, according to the present invention, after performing the screwing test protocols 1 to 11 and directly after performing the brushing treatment.

The figures in column C4 of FIG. 1 show the comparative sample B, the reference fiber cement sample, after performing the screwing test protocols 1 to 11 and directly after performing the brushing treatment.

From the figures in column C2 of FIG. 1, it is clear that in the sample A, according to the present invention, regardless the screwing test protocol and hence the type of screw used, the excess fiber cement residue is nearly always completely removed by simple brushing.

On the other hand, in the comparative sample B in the figures in column C4 of FIG. 1, the excess fiber cement residue is not removed completely. Such a surface requires further refining before a finishing treatment can be applied.

The invention claimed is:

1. A bi-layered fiber cement product comprising a first layer, which first layer is covered by a second layer, each said first and second layers having a thickness, wherein
said first layer is composed of a first layer material having a density of between about 0.4 and about 0.9 $g/cm^3$ inclusive, and comprising cement and between 1 wt % and 70 wt % relative to the total dry weight of said first layer material of a lightweight filler,
said second layer covers only one of the main surfaces of the first layer,
the second layer is composed of a second layer material having a density of between about 0.9 and about 1/4 $g/cm^3$ inclusive, and comprising fibers and cement,
thickness of the second layer is larger than thickness of the first layer, and
said first layer is an outermost layer having an exposed, outwardly-facing surface and said second layer is a bottom layer and configured for facing a wall substrate.

2. The fiber cement product according to claim 1, wherein said lightweight filler is selected from the group consisting of expanded perlite, expanded vermiculite, expanded polystyrene, extruded polystyrene, foam, concrete foam, calcium silicate hydrate gel (CSH gel), microspheres, ceramic microspheres, alkali resistant expanded glass spheres/beads, expanded shale, xonotlite, and mixtures thereof.

3. The fiber cement product according to claim 1, wherein said lightweight filler is expanded perlite.

4. The fiber cement product according to claim 3, wherein said expanded perlite is present in the first layer material in an amount of between 15 wt % and 70 wt % relative to the total dry weight of said first layer material.

5. The fiber cement product according to claim 4, wherein said expanded perlite is present in the first layer material in an amount of between 20 wt % and 40 wt % relative to the total dry weight of said first layer material.

6. The fiber cement product according to claim 1, wherein said first layer material further comprises fibers.

7. The fiber cement product according to claims 1, wherein said fiber cement product comprises between about 15% and about 95% of said first layer material with respect to the total volume of said fiber cement product.

8. The fiber cement product according to claim 6, wherein said first layer material comprises fibers in an amount of between 0 wt % and 5 wt % relative to the total dry weight of said first layer material.

9. The fiber cement product according to claim 6, wherein said fibers in said first layer material comprises cellulose fibers.

10. The fiber cement product according to claim 9, wherein said at least one second layer comprises fibers in an amount of between 6 wt % and 10 wt % relative to the total dry weight of said second layer.

11. The fiber cement product according to claim 9, wherein said fibers in said second layer comprise cellulose fibers.

12. A method for producing a fiber cement product as defined in claim 1, wherein said method comprises the steps of:
  i) Providing a first cementitious material comprising cement and between 1 wt % and 70 wt % (relative to the total dry weight of said first layer material) of a lightweight filler,
  ii) Providing a second fiber cement material comprising fibers and cement,
  iii) Assembling said first cementitious material and said second fiber cement material to obtain a fiber cement product comprising a first layer made of said first cementitious material, which first layer is covered by at least one second layer made of said second fiber cement material, and
  iv) curing said fiber cement product.

13. The method according to claim 12, wherein said step (i) comprises providing a first cementitious material comprising cement and between 15 wt % and 70 wt % (relative to the total dry weight of said cementitious material) of expanded perlite.

14. The method according to claim 12, comprising using said fiber cement product as a building product.

15. The method according to claim 14, wherein the product is fixed to a substrate, such as a wall, with the second layer acting as a bottom layer facing the substrate and the first layer as the top layer which may be further finished.

16. The bi-layered fiber cement product as claimed in claim 1, and composed of only said first and second layers.

17. The bi-layered fiber cement product as claimed in claim 1, wherein the thickness of the second layer is at least twice the thickness of the first layer.

18. The bi-layered fiber cement product as claimed in claim 1, wherein the bi-layered product includes an interface between the first and the second layers, at which interface the first layer and second layer are directly bonded together by superimposition of the first and second layer in a green state and subsequent co-curing of the bi-layered fiber cement product.

19. The bi-layered fiber cement product as claimed in claim 18, wherein
  each of the first and second layers has a first main surface and an opposed second main surface,
  said first main surfaces are bonded together to constitute the interface at which the first layer is covered by the second layer, and
  said second main surface of the first layer is an exposed outermost surface.

* * * * *

UNITED STATES PATENT AND TRADEMARK OFFICE
CERTIFICATE OF CORRECTION

PATENT NO. : 12,227,456 B2  
APPLICATION NO. : 17/641157  
DATED : February 18, 2025  
INVENTOR(S) : Ruben Bordin and Julien Soulhat It is certified that error appears in the above-identified patent and that said Letters Patent is hereby corrected as shown below:

In the Claims

Column 30, Lines 42-43, Claim 1, that portion of the sentence reading:  
"...having a density of between about 0.9 and about 1/4 g/cm³ inclusive..."  
Should read:  
--having a density of between about 0.9 and about 1.4 g/cm³ inclusive--.

Signed and Sealed this  
Seventeenth Day of June, 2025

Coke Morgan Stewart  
*Acting Director of the United States Patent and Trademark Office*